United States Patent
Choi et al.

(10) Patent No.: US 12,418,693 B2
(45) Date of Patent: Sep. 16, 2025

(54) ELECTRONIC DEVICE AND OPERATION METHOD THEREFOR

(71) Applicant: SAMSUNG ELECTRONICS CO., LTD., Suwon-si (KR)

(72) Inventors: Kilsoo Choi, Suwon-si (KR); Sehyun Kim, Suwon-si (KR); Jongin Lee, Suwon-si (KR); Jiwon Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 8 days.

(21) Appl. No.: 18/299,974

(22) Filed: Apr. 13, 2023

(65) Prior Publication Data

US 2023/0262285 A1     Aug. 17, 2023

Related U.S. Application Data

(63) Continuation of application No. PCT/KR2021/014141, filed on Oct. 13, 2021.

(30) Foreign Application Priority Data

Oct. 13, 2020   (KR) .................. 10-2020-0131821

(51) Int. Cl.
*H04N 21/438*    (2011.01)
*H04N 21/431*    (2011.01)
(Continued)

(52) U.S. Cl.
CPC ....... *H04N 21/438* (2013.01); *H04N 21/4312* (2013.01); *H04N 21/472* (2013.01); *H04N 21/64322* (2013.01)

(58) Field of Classification Search
CPC ........... H04N 21/2381; H04N 21/4312; H04N 21/4316; H04N 21/438; H04N 21/44004;
(Continued)

(56) References Cited

U.S. PATENT DOCUMENTS 9,201,470 B2    12/2015    Kim et al.
9,749,379 B2    8/2017     Yun et al.
(Continued)

FOREIGN PATENT DOCUMENTS

JP    4947691    6/2012
JP    5885726    3/2016
(Continued)

OTHER PUBLICATIONS

International Search Report dated Jan. 19, 2022 in International Patent Application. No. PCT/KR2021/014141.
(Continued)

*Primary Examiner* — Rong Le
(74) *Attorney, Agent, or Firm* — STAAS & HALSEY LLP

(57) ABSTRACT

An electronic device including a memory; and a processor configured to: identify whether a multi-view switch to switch from a single view to multi-views occurs; based on the multi-view switch occurring, receive a radio frequency (RF) signal corresponding to content displayed in the single view and store the RF signal in a buffer, while displaying, through the plurality of screens, content based on an Internet protocol (IP) streaming signal; based on a single-view switch to switch from the multi-views to the single view, identify reproduction time information of the IP streaming signal at a time point at which the single-view switch occurs; and identify a reproduction position having same reproduction time information as the identified reproduction time information of the IP streaming signal in the RF signal stored in the buffer, and display, in the single view, the content based on the RF signal from the identified reproduction position.

17 Claims, 12 Drawing Sheets

(51) Int. Cl.
*H04N 21/472* (2011.01)
*H04N 21/643* (2011.01)

(58) Field of Classification Search
CPC .............. H04N 21/4622; H04N 21/472; H04N 21/4858; H04N 21/64322
See application file for complete search history.

(56) References Cited

U.S. PATENT DOCUMENTS

| | | | |
|---|---|---|---|
| 10,148,725 | B2 | 12/2018 | Lee |
| 2013/0194296 | A1 | 8/2013 | Lee |
| 2014/0189739 | A1* | 7/2014 | Kummer ............ H04N 21/4384 725/40 |
| 2015/0181258 | A1 | 6/2015 | Kim et al. |
| 2016/0142770 | A1 | 5/2016 | Waller |
| 2017/0289588 | A1* | 10/2017 | Lee ...................... H04N 21/854 |

FOREIGN PATENT DOCUMENTS

| | | |
|---|---|---|
| JP | 2016-178410 | 10/2016 |
| JP | 6426034 | 11/2018 |
| JP | 6426034 B2 * | 11/2018 |
| KR | 10-1128848 | 3/2012 |
| KR | 10-2013-0087994 | 8/2013 |
| KR | 10-2015-0050329 | 5/2015 |
| KR | 20180002599 A * | 5/2015 |
| KR | 10-2015-0072231 | 6/2015 |
| KR | 10-1758164 | 7/2017 |
| KR | 10-2018-0002599 | 1/2018 |
| KR | 10-1967188 | 4/2019 |
| KR | 10-2111572 | 5/2020 |
| KR | 10-2126257 | 6/2020 |
| KR | 10-2167869 | 10/2020 |

OTHER PUBLICATIONS

Office Action issued by the Korean Patent Office dated Oct. 18, 2024 for Korean Patent Application No. 10-2020-0131821.

* cited by examiner

ELECTRONIC DEVICE AND OPERATION METHOD THEREFOR

CROSS-REFERENCE TO RELATED APPLICATION

This application is a continuation application, under 35 U.S.C. § 111(a), of international application No. PCT/KR2021/014141, filed on Oct. 13, 2021, which claims priority under 35 U. S. C. § 119 to Korean Patent Application No. 10-2020-0131821, filed on Oct. 13, 2020, the disclosures of which are incorporated herein by reference in their entirety.

TECHNICAL FIELD

One or more embodiments relate to an electronic device and an operating method thereof, and more particularly, to an electronic device for providing seamless screen switching between multi-views and a single view and an operating method of the electronic device.

BACKGROUND ART

Previously, in general, a display device, such as a television, etc., may receive a piece of broadcasting content and display the piece of broadcasting content on a single screen of the display device. Recently, there have been attempts to provide users with a plurality of pieces of content associated with broadcasting content in order to provide various content experiences to the users, and also, attempts to provide a multi-streaming service in which a display device may split a display screen into a plurality of screens and display a different piece of content on each of the plurality of split screens.

Because a content source in a case in which a display device displays content on a single screen in a single-view mode and a signal source in a case in which the single screen is split into a plurality of screens and a different piece of content is displayed on each split screen in a multi-view mode are different from each other, screen disconnection, etc. may occur when a single view is switched to multi-views.

DISCLOSURE

Technical Problem

According to various embodiments, an electronic device capable of seamless screen switching between a single view and multi-views and an operating method of the electronic device are provided.

Technical Solution

An electronic device according to an embodiment includes: a memory to store one or more instructions; and a processor configured to execute the one or more instructions stored in the memory to: identify whether a multi-view switch to switch from a single view in which content is displayed on a single screen to multi-views of displaying through a plurality of screens occurs; based on the multi-view switch being identified as occurring, receive a radio frequency (RF) signal corresponding to the content displayed in the single view and store the RF signal in a buffer, while displaying, through the plurality of screens, content based on an Internet protocol (IP) streaming signal; based on a single-view switch to switch from the multi-views to the single view being identified as occurring, identify reproduction time information of the IP streaming signal at a time point at which the single-view switch to switch from the multi-views to the single view occurs; and identify a reproduction position having same reproduction time information as the identified reproduction time information of the IP streaming signal in the RF signal stored in the buffer, and display, in the single view, the content based on the RF signal from the identified reproduction position.

According to an embodiment, the content based on the IP streaming signal displayed through the plurality of screens in the multi-views may be associated with the content based on the RF signal displayed in the single view.

According to an embodiment, content based on the IP streaming signal displayed through a first screen from among the plurality of screens included in the multi-views may be the same as the content based on the RF signal displayed in the single view.

According to an embodiment, the processor may further be configured to execute the one or more instructions to: identify attribute information of the content based on the IP streaming signal displayed through the first screen; and according to the identified attribute information, output, on a region of the first screen, a user interface to receive a user input to allow selecting to switch the content displayed on the first screen from among the plurality of screens included in the multi-views to being displayed in the single view.

According to an embodiment, the processor may further be configured to execute the one or more instructions to, based on the user input selecting to switch to the single view, display the content displayed on the first screen from among the plurality of screens included in the multi-views in the single view.

According to an embodiment, the reproduction position identified in the stored RF signal may indicate a delayed time point compared with a current reproduction position of the RF signal broadcast in real time.

According to an embodiment, the processor may further be configured to execute the one or more instructions to release the buffer storing the RF signal and display the content by switching to an RF live view, based on the reproduction position in the stored RF signal being same as the current reproduction position of the RF signal broadcast in real time by increasing a reproducing speed for displaying the content from the identified reproduction position.

An operating method of an electronic device according to an embodiment includes: identifying whether a multi-view switch to switch from a single view in which content is displayed on a single screen to multi-views of displaying through a plurality of screens occurs; based on the multi-view switch being identified as occurring, receiving a radio frequency (RF) signal corresponding to the content displayed in the single view and storing the RF signal in a buffer, while displaying, through the plurality of screens, content based on an Internet protocol (IP) streaming signal; based on a single-view switch to switch from the multi-views to the single view being identified as occurring, identifying reproduction time information of the IP streaming signal at a time point at which the single-view switch to switch from the multi-views to the single view occurs; and identifying a reproduction position having same reproduction time information as the identified reproduction time information of the IP streaming signal in the RF signal stored in the buffer, and displaying, in the single view, the content based on the RF signal from the identified reproduction position.

A non-transitory computer-readable recording medium having recorded thereon one or more programs executed by a processor of an electronic device for realizing an operating method of the electronic device according to an embodiment, the operating method including: identifying whether a multi-view to switch from a single view in which content is displayed on a single screen to multi-views of displaying through a plurality of screens occurs; based on the multi-view switch being identified as occurring, receiving a radio frequency (RF) signal corresponding to the content displayed in the single view and storing the RF signal in a buffer, while displaying, through a plurality of screens, content based on an Internet protocol (IP) streaming signal; based on a single-view switch to switch from the multi-views to the single view being identified as occurring, identifying reproduction time information of the IP streaming signal at a time point at which the single-view switch to switch from the multi-views to the single view; and identifying a reproduction position having same reproduction time information as the identified reproduction time information of the IP streaming signal in the RF signal stored in the buffer, and displaying, in the single view, the content based on the RF signal from the identified reproduction position.

Advantageous Effects

According to various embodiments of the disclosure, when multi-views are switched to a single view, reproduction may be performed by using a radio frequency (RF) signal stored in a buffer, and thus, seamless screen switching without disconnection from a screen reproduced in the multi-views may be realized.

MODE FOR INVENTION

Figure 1:
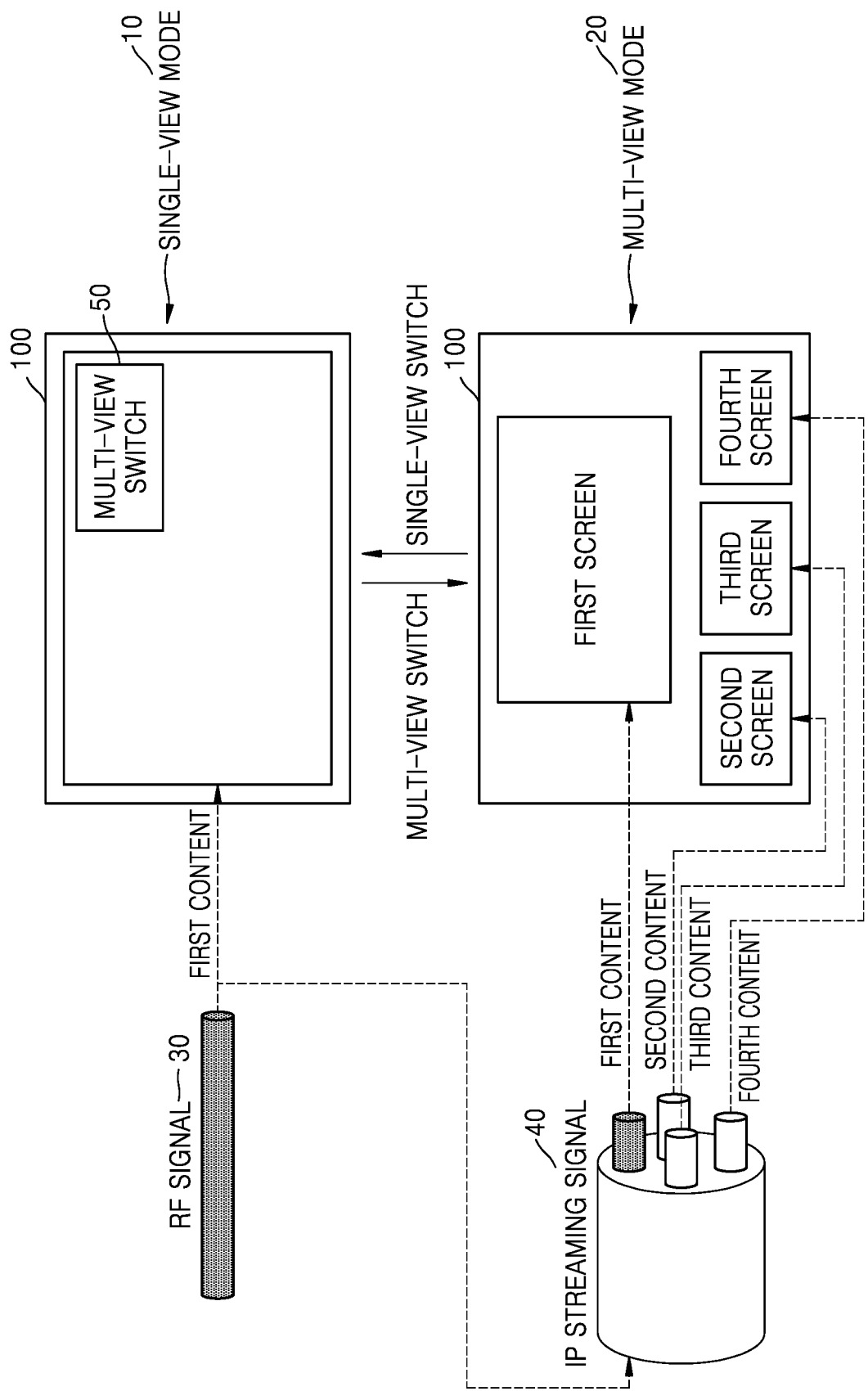
FIG. 1 is a reference diagram for describing switching between a single-view mode and a multi-view mode and from the single-view mode to the multi-view mode, according to an embodiment.

The terms used herein will be briefly described and then the disclosure will be described in detail.

In the disclosure, general terms that have been widely used nowadays are selected, when possible, in consideration of functions of the disclosure, but non-general terms may be selected according to the intentions of technicians in the this art, precedents, or new technologies, etc. Also, some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

Throughout the disclosure, it will be understood that when an element is referred to as "including" an element, the element may further include another element, rather than excluding the other element, unless mentioned otherwise. Also, terms such as "unit," "module," etc., described in the specification indicate a unit that processes at least one function or operation, and the unit may be embodied in a hardware manner, a software manner, or a combination of the hardware manner and the software manner.

Hereinafter, embodiments of the disclosure will be described in detail with reference to the accompanying drawings, so that the embodiments of the disclosure may be easily implemented by one of ordinary skill in the art. However, the disclosure may have different forms and should not be construed as being limited to the embodiments of the disclosure described herein. Also, in the drawings, parts not related to descriptions are omitted for the clear description of the disclosure, and throughout the specification, like reference numerals are used for like elements.

The term "user" in embodiments of the disclosure described in this specification may denote a person controlling a function or an operation of a computing device or an electronic device by using a controller and may also denote a viewer, a manager, or an installing technician.

According to an embodiment of the present specification, the term "multi-streaming service" may indicate a service in which a display screen of an electronic device is split into a plurality of regions, and each split region is used as a sub-screen to provide a different piece of content. The display screen may be split into two or more sub-screens. Content provided on each sub-screen may include main content and content associated with the main content. The content provided on each sub-screen may be content from the same source or content from different sources. The multi-streaming service may also be referred to as a multi-view service or a multi-screen service.

FIG. 1 is a reference diagram for describing switching between a single-view mode and a multi-view mode and from the single-view mode to the multi-view mode.

Referring to FIG. 1, a single-view mode 10 is a mode in which a display device, such as a television (TV), etc., displays one piece of content on a single screen of a display. The content displayed in the single-view mode 10 may include broadcasting content directly received from a broadcasting station, broadcasting content received through an external source, content received from a content providing server through the Internet, etc.

In order to provide more various content experiences to users, a multi-view mode 20 may be provided with respect to the broadcasting content. The multi-view mode 20 is a mode in which a display screen of a display device is split into a plurality of screens, and a different piece of content is displayed on each split screen. To distinguish the plurality of split screens from a single screen included in a display, each split screen may be referred to as a sub-screen. Referring to FIG. 1, the multi-view mode 20 may include, for example, four screens, namely, a first screen, a second screen, a third screen, and a fourth screen.

A display mode of a display device may be indicated as a single-view mode, and then may be switched to a multi-view mode. When after certain content is displayed in the single-view mode, the display mode is switched to the multi-view mode, content displayed in the multi-view mode may be associated with the content displayed in the single-view mode. For example, in the case of sports game content, such as baseball, etc., content displayed on the plurality of screens in the multi-view mode may correspond to a plurality of scenes to be captured in the corresponding sports game content. For example, each screen in the multi-view mode may display content focusing on a hitter, content focusing on a catcher, content focusing on a manager, or content focusing on a spectator. For example, in the case of content relaying a performance, each screen in the multi-view mode may display content focusing on a separate performer performing an act or a play in the corresponding performance.

The content displayed in the multi-view mode may include content providing additional information with respect to the content displayed in the single-view mode. For example, the additional information with respect to the content may include a score of a baseball match, information about a team, or information about baseball players with respect to a baseball match broadcast and may include information about performers or information about a performing event with respect to a performance relay broadcast.

Referring to FIG. 1, in the single-view mode 10, an electronic device may receive a radio frequency (RF) signal 30 corresponding to first content and display the RF signal 30 on a single screen. The RF signal 30 may be directly received by the electronic device through a tuner or may be received through an external device, such as a set-top box, etc.

In the single-view mode 10, the electronic device 100 displaying the first content may receive a multi-view switch request. The multi-view switch request may be received through various user interfaces, for example, via a control signal through a remote controller or a key input signal or a sound recognition function provided in the electronic device. However, for example, an item of <multi-view switch> 50 may be provided on a portion of the screen displaying the first content, and according to an input of selecting the item, the multi-view request switch may be received. For example, the electronic device 100 may identify an attribute of content displayed on the screen, and when it is recognized based on the attribute of the content that the content is available for the multi-view switch, the electronic device 100 may output a user interface indicating a multi-view switch on a region of the screen displaying the content.

The electronic device 100 having received the multi-view switch request may receive an Internet protocol (IP) streaming signal 40 through an external server, such as an IP streaming server, and may display a plurality of pieces of content included in the IP streaming signal 40 on a plurality of screens, respectively. For example, the electronic device 100 may display first content included in the IP streaming signal 40 on a first screen, second content included in the IP streaming signal 40 on a second screen, third content included in the IP streaming signal 40 on a third screen, and fourth content included in the IP streaming signal 40 on a fourth screen. For example, when the first content corresponding to the RF signal 30 and displayed by the electronic device 100 in a single view is main image content of a baseball match, the first content corresponding to the IP streaming signal 40 displayed in multi-views may be the same main image of the baseball match as displayed in the single view, the second content may be an image focusing on a hitter of the corresponding baseball match, the third content may be an image focusing on a manager, and the fourth content may be an image focusing on spectators, for example.

The IP streaming signal 40 is a signal generated by obtaining the RF signal 30 corresponding to the first content that is broadcast in real time and packaging the obtained RF signal 30 with other content, and thus, the IP streaming signal 40 may be delayed for a predetermined time period, for example, for several seconds, compared with the RF signal 30 broadcast in real time. That is, a predetermined time difference may occur between the RF signal 30 sent from a broadcasting station and the IP streaming signal 40 sent from the IP streaming server, etc. For example, when the electronic device 100 displays the first content at a reproduction position 00:00:40 by receiving the RF signal, the electronic device 100 may receive the IP streaming signal 40 and display the first to fourth content, because the electronic device 100 may receive a multi-view switch request. In this case, when the time difference between the RF signal and the IP streaming signal is two seconds as described above, the electronic device 100 may display the first to fourth content, for example, at a reproduction position 00:00:38. Like this, because a predetermined time difference may occur between the RF signal 30 and the IP streaming signal 40, the content displayed in the multi-view mode may always be delayed for a predetermined time period compared with the content displayed in the single-view mode. Thus, when the multi-view mode is switched again to the single-view mode, it is inevitable that a reproduction position in the single-view mode may fall into a further proceeded position compared with the reproduction position in the multi-view mode. For example, when a single-view switch request is received when the content is displayed at a reproduction position 00:20:40 in the multi-view mode, the electronic device 100 may receive the RF signal of a reproduction position 00:20:42, which is further proceeded by two seconds, to display the content, and thus, from the perspective of a user, an image in which content corresponding to about two seconds is skipped may be viewed according to the single-view switch. Therefore, the disclosure provides a method of preventing a screen disconnection phenomenon which may occur when a multi-view mode is switched to a single-view mode and of providing seamless screen switching.

Figure 2:
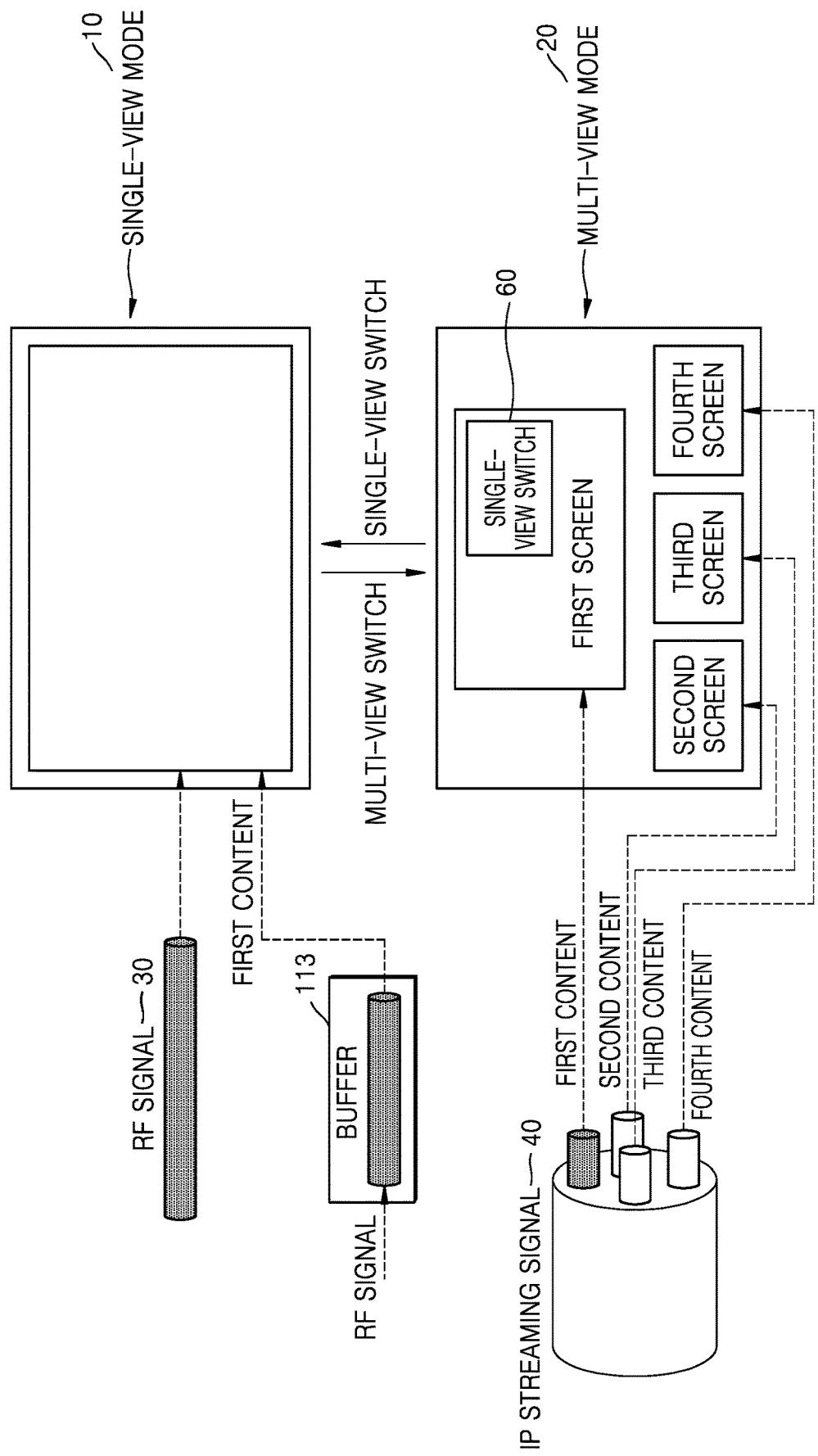
FIG. 2 is a reference diagram for describing a method, performed by an electronic device, of providing seamless screen switching, when the electronic device switches from a multi-view mode to a single-view mode, according to an embodiment.

FIG. 2 is a reference diagram for describing a method, performed by an electronic device, of providing seamless screen switching, when the electronic device switches from a multi-view mode to a single-view mode, according to an embodiment.

Referring to FIG. 2, when a single-view is switched to multi-views, the electronic device 100 according to an embodiment may display the first content, the second content, the third content, and the fourth content obtained from the IP streaming signal 40 on the plurality of screens included in the multi-views of the electronic device, and along with this, may receive the RF signal 30 corresponding to the first content and store the received RF signal 30 in a buffer 113. The buffer 113 may include any memory device having a space for storing the received RF signal. For example, the buffer 113 may have a predetermined size and may store the RF signal to an extent according to the predetermined size. For example, the buffer 113 may store the RF signal to the extent of several seconds to dozens of seconds.

According to an embodiment, when the multi-view mode is switched to the single-view mode, the electronic device 100 may not receive the RF signal 30 and display the first content, but may display the first content based on the RF signal stored in the buffer 113. When the first content is displayed by receiving the RF signal broadcast in real time, the first content may be displayed only from a reproduction position currently broadcast in real time. However, by using the RF signal stored in the buffer 113, the electronic device 100 may actively determine the reproduction position of the RF signal.

According to an embodiment, when a switch from the multi-view mode to the single-view mode is requested, the electronic device 100 may obtain reproduction time information corresponding to a reproduction position of the IP streaming signal displayed by the electronic device 100, may identify, in the buffer 113, a reproduction position of the RF signal having the same reproduction time information as the reproduction time information of the IP streaming signal, and may display content corresponding to the RF signal from the identified reproduction position of the RF signal. As described above, when the multi-view mode is switched to the single-view mode, the content may be displayed from the reproduction position of the RF signal having the same reproduction time information as the reproduction time information corresponding to the reproduction position of the IP streaming signal, and thus, the reproduction time point of the last content displayed in the multi-views before the switch to the single-view may be matched with the reproduction time point of the initial content displayed in the single-view mode. Thus, seamless screen switching may be possible.

According to an embodiment, the reproduction position of the RF signal stored in the buffer, identified by the electronic device 100, may indicate a delayed time point compared with a current reproduction position of the RF signal broadcast in real time.

According to an embodiment, when the electronic device 100 reproduces the first content from the reproduction position identified in the buffer with respect to the single-view switch, the electronic device 100 may increase a reproducing speed, and thus, when the reproduction position of the RF signal stored in the buffer becomes the same as the current reproduction position of the RF signal broadcast in real time, may release the buffer storing the RF signal and may switch to an RF live view for displaying content.

According to an embodiment, in the multi-view mode, the electronic device 100 may identify attribute information of the content based on the IP streaming signal displayed on the plurality of screens included in the multi-views, and according to the identified attribute information, may output, on a region of the screen, a user interface to receive a user input for selecting a switch of the content displayed on the screen to a single view. For example, referring to FIG. 2, the electronic device 100 may identify the attribute information of the first content displayed on the first screen in the multi-view mode 20, and according to the identified attribute information, may recognize that the first content is based on the RF signal. Thus, the electronic device 100 may output, on a region of the first screen, an item of <single-view switch> 60, for receiving the user input of selecting a switch into the single view, with respect to the first content output on the first screen. As described above, by providing a menu for adaptively controlling the content output on each of the plurality of screens included in the multi-views, according to an attribute of the content, the user may be enabled to easily and intuitively control the content provided on the plurality of screens.

According to an embodiment, when the electronic device 100 receives the user input of selecting the single-view switch on any one of the plurality of screens included in the multi-views, the electronic device 100 may display the content displayed on the corresponding screen in the single view.

Figure 3:
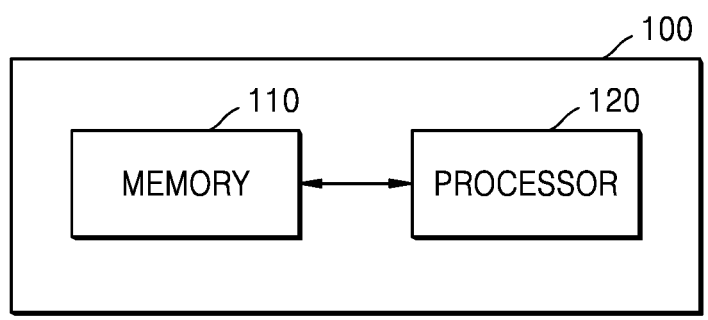
FIG. 3 is a schematic block diagram of an electronic device according to an embodiment.

FIG. 3 is a schematic block diagram of an electronic device according to an embodiment.

Referring to FIG. 3, the electronic device 100 may include a memory 110 and a processor 120. However, the electronic device 100 may be realized by including more components than the illustrated components and is not limited to the described example.

The memory 110 according to an embodiment may store a program for processing and controlling by the controller 120 and may store data input to the electronic device 100 or output from the electronic device 100.

The memory 110 may include at least one type of storage medium from among a flash memory type, a hard disk type, a multimedia card micro type, a card type memory (e.g., an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The processor 120 may control general operations of the electronic device 100. For example, the processor 120 may execute one or more instructions stored in the memory 110 to perform functions of the electronic device 100 described herein.

According to an embodiment of the disclosure, the processor 120 may execute the one or more instructions stored in the memory 110 to control the operations described above to be performed. In this case, the memory 110 may store the one or more instructions executable by the processor 120.

Also, according to an embodiment of the disclosure, the processor 120 may store one or more instructions in an internal memory provided in the processor 120 and may execute the one or more instructions stored in the internal memory provided in the processor 120 to control the operations described above to be performed. That is, the processor 120 may execute at least one instruction or program stored in the internal memory of the processor 120 or the memory 110 to perform a predetermined operation.

Also, although FIG. 3 illustrates one processor 120, a plurality of processors (not shown) may be provided. In this case, each of the operations performed by the electronic device according to an embodiment of the disclosure may be performed by at least one of the plurality of processors.

According to an embodiment, the processor 120 may execute one or more instructions stored in the memory 110 to: receive a multi-view switch request for a switch from a single view in which content is displayed on a single screen to multi-views; in response to the multi-view switch request, display content based on an IP streaming signal through a plurality of screens, and along with this, receive an RF signal corresponding to content displayed in the single view and store the RF signal in a buffer; in response to a single-view switch request for a switch from the multi-views to the single-view, identify reproduction time information of the IP streaming signal at a time point at which the single-view switch request is received; identify, in the RF signal stored in the buffer, a reproduction position having the same reproduction time information as the identified reproduction time information; and display content based on the RF signal in the single view from the identified reproduction position.

According to an embodiment, the content based on the IP streaming signal displayed through the plurality of screens in the multi-views may be content associated with the content based on the RF signal displayed in the single view.

According to an embodiment, content based on the IP streaming signal displayed through a first screen from among the plurality of screens included in the multi-views may be the same content as the content based on the RF signal displayed in the single view.

According to an embodiment, the processor may execute the one or more instructions to: identify attribute information of the content based on the IP streaming signal displayed through the first screen; and according to the identified attribute information, output, on a region of the first screen, a user interface to receive a user input for selecting a switch to the single view with respect to the content displayed on the first screen.

According to an embodiment, the processor may execute the one or more instructions to, in response to the user input for selecting the switch to the single view, display the content displayed on the first screen in the single view.

According to an embodiment, the reproduction position identified in the stored RF signal may indicate a delayed time point compared with a current reproduction position of the RF signal broadcast in real time.

According to an embodiment, the processor may execute the one or more instructions to release the buffer storing the RF signal and switch to an RF live view, when the reproduction position in the stored RF signal becomes the same as the current reproduction position of the RF signal broadcast in real time because a reproducing speed is increased when the RF signal is reproduced from the identified reproduction position.

The electronic device 100 may include all types of devices configured to perform functions by including a processor and a memory. The electronic device 100 may be stationary device or a portable device. For example, the electronic device 100 may include various electronic devices, for example, a computer, such as a desktop computer, a laptop computer, a tablet computer, a television, a set-top box, a smartphone, a cellular phone, a game player, a music player, a video player, a medical device, a home appliance product, etc. The electronic device 100 may also be referred to as a display device, a computing device, and a media device.

Figure 4:
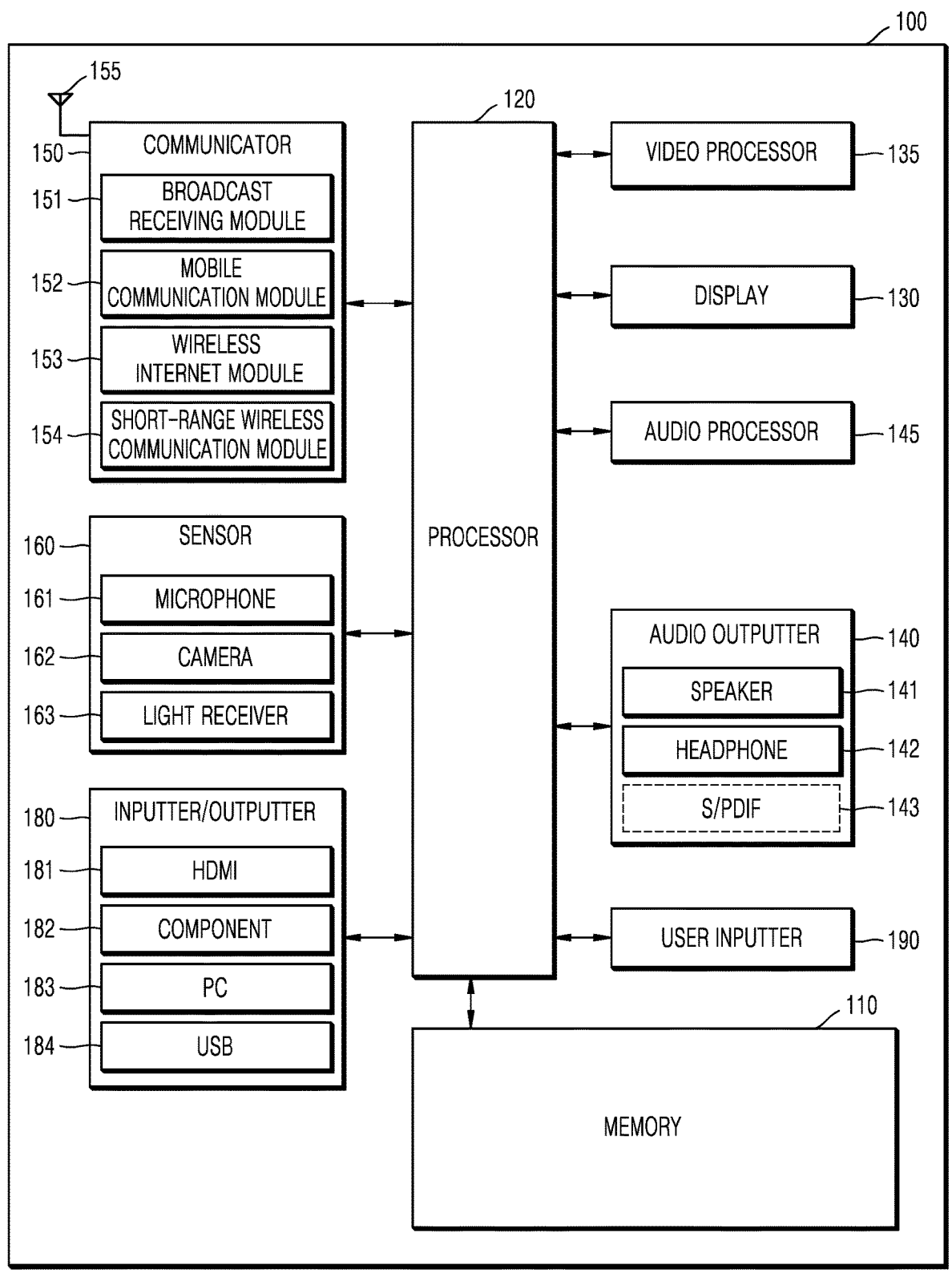
FIG. 4 is a detailed block diagram of an electronic device according to an embodiment.

FIG. 4 is a detailed block diagram of an electronic device according to an embodiment.

In FIG. 4, components that are the same as the components in FIG. 3 are illustrated by using the same reference numerals. Thus, for describing the electronic device 100, the same descriptions as FIG. 3 are omitted.

Referring to FIG. 4, the electronic device 100 may further include a display 130, a video processor 135, an audio processor 145, an audio outputter 140, a communicator 150, an antenna 155, a sensor 160, an inputter/outputter 180, and a user inputter 190, in addition to the memory 110 and the processor 120. The processor 120 may control each component of the electronic device 100 to perform an operation.

The same configurations with respect to the memory 110 and the processor 120 as FIG. 3 are not described in FIG. 4.

The display 130 may display an image on a screen according to control by the processor 120. The image displayed on the screen may be received from the communicator 150, the inputter/outputter 180, and the memory 110.

The video processor 135 may process image data to be displayed on the display 130 and may perform, on the image data, various image processing operations, such as decoding, rendering, scaling, noise filtering, frame rate conversion, resolution conversion, etc.

According to an embodiment, the video processor 135 may configure the screen of the display 130 as a single-view screen to display one piece of video content.

According to an embodiment, the video processor 135 may configure the screen of the display 130 as a multi-view screen to display different pieces of video content on a plurality of screens included in the multi-view screen.

The audio processor 145 may process audio data. The audio processor 145 may perform various processing operations on the audio data, such as decoding, amplification, noise filtering, etc.

The audio outputter 140 may output audio included in a received broadcasting signal, audio input through the communicator 150 or the inputter/outputter 180, and audio stored in the memory 110, according to control by the processor 120. The audio outputter 140 may include at least one of a speaker 141, a headphone output terminal 142 or a Sony/Philips digital interface (S/PDIF) output terminal 143.

The antenna 155 for transmission/reception may receive signals transmitted by other devices or transmit signals to the other devices. The antenna 155 for transmission/reception is illustrated as a single member. However, a plurality of antennas may be provided to support a multiple input multiple output (MIMO) system.

The communicator 150 may include one or more modules enabling wireless communication between the electronic device 100 and a wireless communication system or between the electronic device 100 and a network in which another electronic device is arranged. For example, the communicator 150 may include a broadcast receiving module 151, a mobile communication module 152, a wireless Internet module 153, and a short-range wireless communication module 154. The communicator 150 may be referred to as a transmitter/receiver.

The broadcast receiving module 151 may receive a broadcasting signal and/or broadcasting-related information from an external broadcasting management server through a broadcasting channel. The broadcasting signal may include not only a TV broadcasting signal, a radio broadcasting signal, and a data broadcasting signal, but may also include a type of broadcasting signal in which a data broadcasting signal is combined with a TV broadcasting signal or a radio broadcasting signal.

The mobile communication module 152 may transceive a wireless signal with at least one of a base station, an external terminal, and a server on a mobile communication network. The wireless signal may include a sound call signal, a video-telephony call signal, or various forms of data based on transmission and reception of text/multimedia.

The wireless Internet module 153 may refer to a module for wireless Internet connection and may be embedded in a device or provided as an external component of the device. For wireless Internet technologies, wireless local area network (WLAN) (or Wifi), wireless broadband (Wibro), world interoperability for microwave access (Wimax), high speed downlink packet access (HSDPA), etc. may be used. Through the wireless Internet module 154, the device may form Wifi peer to peer (P2P) connection with another device.

The short-range wireless communication module 154 may refer to a module for short-range wireless communication. For short-range wireless communication technologies, Bluetooth, radio frequency identification (RFID), infrared data association (IrDA), ultra wideband (UWB), Zigbee, etc. may be used.

The sensor 160 may sense a voice, an image, or an interaction of a user and may include a microphone 161, a camera 162, and a light receiver 163.

The microphone 161 may receive a voice utterance of the user. The microphone 161 may convert the received voice into an electrical signal and may output the electrical signal through the processor 120.

According to an embodiment, the microphone 161 may receive a voice command of the user for controlling a magic hand function and transmit the received voice command to the processor 120, according to control by the processor 120.

The camera 162 may receive an image (for example, consecutive frames) corresponding to a motion of the user including a gesture within a camera recognition range.

The light receiver 163 may receive an optical signal (including a control signal) received from a remote controlling device. The light receiver 163 may receive the optical signal corresponding to a user input (for example, a touch input, a press input, a touch gesture, a voice, or a motion) from the remote controlling device. A control signal may be extracted from the received optical signal according to control by the processor 120.

The inputter/outputter 180 may receive video (for example, a motion picture, etc.), audio (for example, a voice, music, etc.), and additional data (for example, an electronic program guide (EPG), etc.) from the outside of the electronic device 100, according to control by the processor 120. The inputter/outputter 180 may include one of a high-definition multimedia interface (HDMI) port 181, a component jack 182, a personal computer (PC) port 183, and a universal serial bus (USB) port 184. The inputter/outputter 180 may include a combination of the HDMI port 181, the component jack 182, the PC port 183, and the USB port 184.

According to an embodiment, the HDMI port 181 may receive broadcasting content from a set-top box or a content providing device according to control by the processor 120.

The user inputter 190 may denote a device via which a user may input data for controlling the electronic device 100. For example, the user inputter 190 may include a key pad, a dome switch, a touch pad, a jog wheel, a jog switch, etc., but is not limited thereto.

The memory 110 according to an embodiment may store a program for processing and controlling by the controller 120 and may store data input to the electronic device 100 or output from the electronic device 100. Also, the memory 110 may store data required for operations of the electronic device 100.

Also, programs stored in the memory 110 may be classified into a plurality of modules according to their functions.

The processor 120 may control general operations of the electronic device 100, control signal flows among the built-in components (not shown) of the electronic device 100, and process data. When there is a user input or a condition predetermined and stored is met, the processor 120 may execute an operation system (OS) or various applications stored in the memory 110.

Also, the processor 120 may include an internal memory. In this case, at least one of the data, the program, and the instruction stored in the memory 110 may be stored in the internal memory (not shown) of the processor 120.

FIGS. 3 and 4 illustrate block diagrams of the electronic device 100, according to an embodiment. Each component of the block diagrams may be integrated, added, or omitted according to the specification of the electronic device 100 that is actually realized. For example, two or more components may be integrated into one component, or one component may be divided into two or more components, according to necessity. Also, functions executed in each block are disclosed to describe the embodiments, and their specific operations or devices do not limit the scope of the disclosure.

Figure 5:
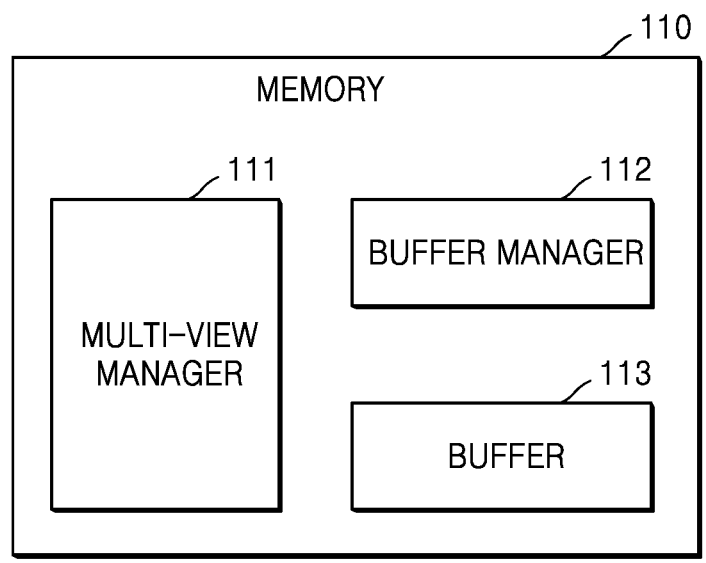
FIG. 5 illustrates an example of a memory for configuring a switch module between a single view and multi-views, according to an embodiment.

FIG. 5 illustrates an example of the memory 110 for configuring a switch module between a single view and multi-views, according to an embodiment.

In FIG. 5, a multi-view manager 111, a buffer manager 112, and the buffer 113 are implemented by software stored in the memory 110. However, the multi-view manager 111, the buffer manager 112, and the buffer 113 are not limited thereto. The multi-view manager 111, the buffer manager 112, and the buffer 113 may be implemented by a combination of appropriate software, logic, circuits, interfaces, and/or codes operating to perform a switch function between a single view and multi-views disclosed in the specification.

According to an embodiment, the multi-view manger 111 may manage general operations for controlling a switch between the single view and the multi-views. For example, when the multi-view manager 111 receives a request of the switch from the single view to the multi-views, the multi-view manager 111 may perform control operations to receive an IP streaming signal corresponding to content of an RF signal displayed in the single view and display a plurality of pieces of content extracted from the IP streaming signal on a plurality of split screens, respectively. Also, when the multi-view manager 111 receives the request of the switch from the single view to the multi-views, the multi-view manager 111 may control the buffer manager 112 to store, in the buffer, the RF signal received through the communicator. Also, when the multi-view manager 111 receives a request of a switch from the multi-views to the single view, the multi-view manager 111 may control content to be reproduced from a reproduction position of the RF signal stored in the buffer, the reproduction position of the RF signal stored in the buffer having the same reproduction time information as reproduction time information of the IP streaming signal reproduced in a multi-view mode.

According to an embodiment, the buffer manager 112 may control the RF signal received in a single-view mode to be continually received and stored in the buffer 113, when the single view is switched to the multi-views according to control by the multi-view manager 111.

According to an embodiment, the buffer 113 may store the RF signal received through the communicator to a predetermined extent, according to control by the buffer manager 112.

Figure 6:
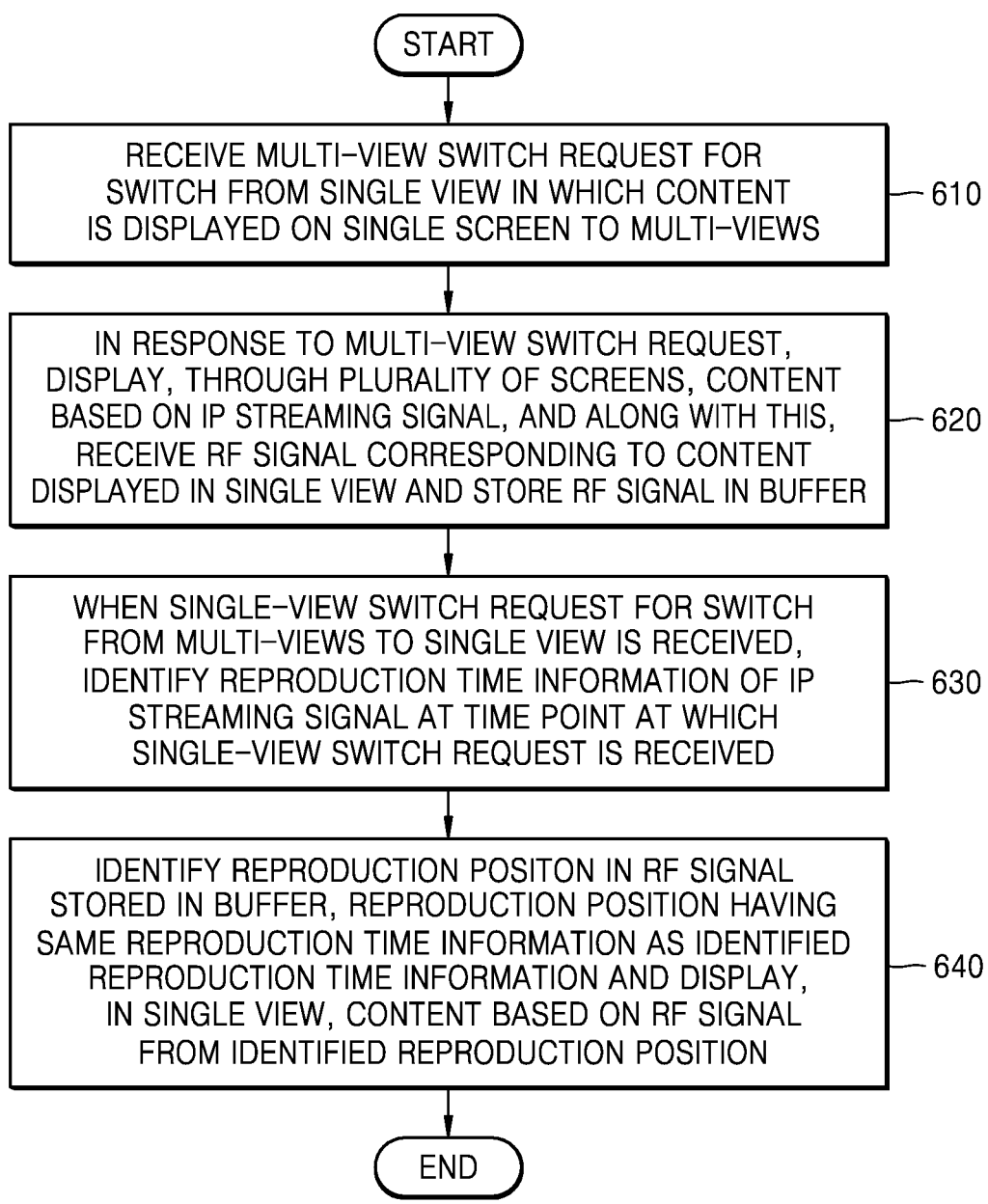
FIG. 6 is a flowchart of operations of a method of providing seamless screen switching between multi-views and a single view, according to an embodiment.

FIG. 6 is a flowchart of operations of a method of providing a seamless screen switch between multi-views and a single view, according to an embodiment.

Referring to FIG. 6, in operation 610, the electronic device 100 may receive a request of a switch from the single view to the multi-views.

For example, the electronic device 100 may directly receive the RF signal through a communicator or receive the RF signal broadcast in real time from a set-top box or an external source through an HDMI interface, etc. and may display content in a single-view mode in which the content is displayed on a single screen of a display of the electronic device 100.

The multi-views are a mode in which the display of the electronic device 100 is split into a plurality of screens, and different pieces of content are displayed on the plurality of split screens, respectively. While the electronic device 100 displays content on a single screen in the single-view mode, the electronic device 100 may receive a multi-view switch request for a switch from the single view to the multi-views.

According to an embodiment, when the single view is switched to the multi-views, at least one piece of content from among the plurality of pieces of content displayed in the multi-views may be the same as the content displayed in the single view. Also, the plurality of pieces of content displayed in the multi-views may be associated with the content displayed in the single view.

The electronic device 100 may receive the multi-view switch request in various forms. According to an embodiment, the electronic device 100 may receive the multi-view switch request via sound recognition. For example, when the electronic device 100 receives a voice utterance, such as <please switch to multi-views> through the microphone 161, the electronic device 100 may receive the multi-view switch request by recognizing this voice utterance. According to an embodiment, the electronic device 100 may receive the multi-view switch request by recognizing a predetermined gesture of a user through the camera 162. According to an embodiment, the electronic device 100 may receive the multi-view switch request by receiving a signal corresponding to a predetermined button provided in a remote controller. According to an embodiment, the electronic device 100 may display an item of <multi-view switch> on a region of a screen on which the content is displayed in the single-view mode and may receive a user input of selecting the displayed item of <multi-view switch> to receive the multi-view switch request.

In operation 620, in response to the multi-view switch request, the electronic device 100 may display content based on an IP streaming signal through the plurality of screens and may also receive the RF signal and store the received RF signal in the buffer.

According to an embodiment, when the electronic device 100 receives the multi-view switch request, the electronic device 100 may split a screen of the display into a plurality of screens and may control the plurality of split screens to display different pieces of content, respectively. In order to display the different pieces of content on the plurality of split screens, respectively, the electronic device 100 may request, from an IP streaming server, IP streaming content corresponding to the content displayed in the single view. For example, the multi-view manager may request, from the IP streaming server, multi-view content corresponding to the content displayed in the single view by using an identifier of the content displayed in the single view.

According to an embodiment, the electronic device 100 may extract a plurality of pieces of content from the IP streaming signal received from the IP streaming server and may output the extracted plurality of pieces of content on the plurality of split screens, respectively, to provide the multi-views.

According to an embodiment, in response to the multi-view switch request, the electronic device 100 may not only receive and display the multi-view content on the plurality of screens, but may also keep receiving the RF signal received previously in the single view and store the received RF signal in the buffer. As described above, even when the single view is ended because the single view is switched to the multi-views, the RF signal may be stored in the buffer and may be used later when the multi-views are switched back to the single view. By doing so, seamless screen switching may be realized.

According to an embodiment, the electronic device 100 may allocate the buffer having a predetermined size and may continually store the RF signal in the buffer, so that the electronic device 100 may always contain the RF signal having a predetermined volume at an arbitrary time point. For example, the electronic device 100 may store, in the buffer, the RF signal to the extent of several seconds to dozens of seconds.

In operation 630, when the electronic device 100 receives a single-view switch request for a switch from the multi-views to the single view, the electronic device 100 may identify reproduction time information of the IP streaming signal at a time point at which the single-view switch request is received.

According to an embodiment, the electronic device 100 may identify, based on attribute information of content displayed on each screen of the plurality of screens in the multi-views, whether the corresponding content is available for a switch to the single view, and when it is determined based on the identifying that the content is available for the switch to the single view, may output, on a region of the corresponding screen, an item of <single-view switch> for selecting the single-view switch. For example, when, based on the identifying of whether the corresponding content is available for the switch to the single view based on the attribute information of the content displayed on each screen of the plurality of screens included in the multi-views, the electronic device 100 determines that the corresponding content is not available for the switch to the single view, the electronic device 100 may not output the single-view switch item on the corresponding screen. As described above, the single-view switch item may be output on the screen with respect to which the single-view switch is available, and the single-view switch item may not be output on the screen with respect to which the single-view switch is not available. By doing so, the user may be informed of which screen from among the plurality of screens included in the multi-views is available for the single-view switch, and which is not, thus to intuitively recognize the screen available for the single-view switch.

According to an embodiment, when the electronic device 100 receives the single-view switch request, the electronic device 100 may identify reproduction time information of the IP streaming signal displayed at a time point at which the single-view switch request is received. For example, the electronic device 100 may identify the reproduction time information by identifying a presentation time stamp (PTS), etc. of the IP streaming signal displayed at the time point at which the single-view switch request is received.

In operation 640, the electronic device 100 may identify a reproduction position in the RF signal stored in the buffer, the reproduction position having the same reproduction time information as the identified reproduction time information, and may display the content based on the RF signal in the single view from the identified reproduction position.

For example, the electronic device 100 may identify, in the RF signal stored in the buffer, the reproduction position having the same PTS as the PTS of the IP streaming signal at the time point at which the single-view switch request is received, and may reproduce the RF signal in the single view from the identified reproduction position. Thus, seamless screen switching without screen disconnection may be performed.

Figure 7:
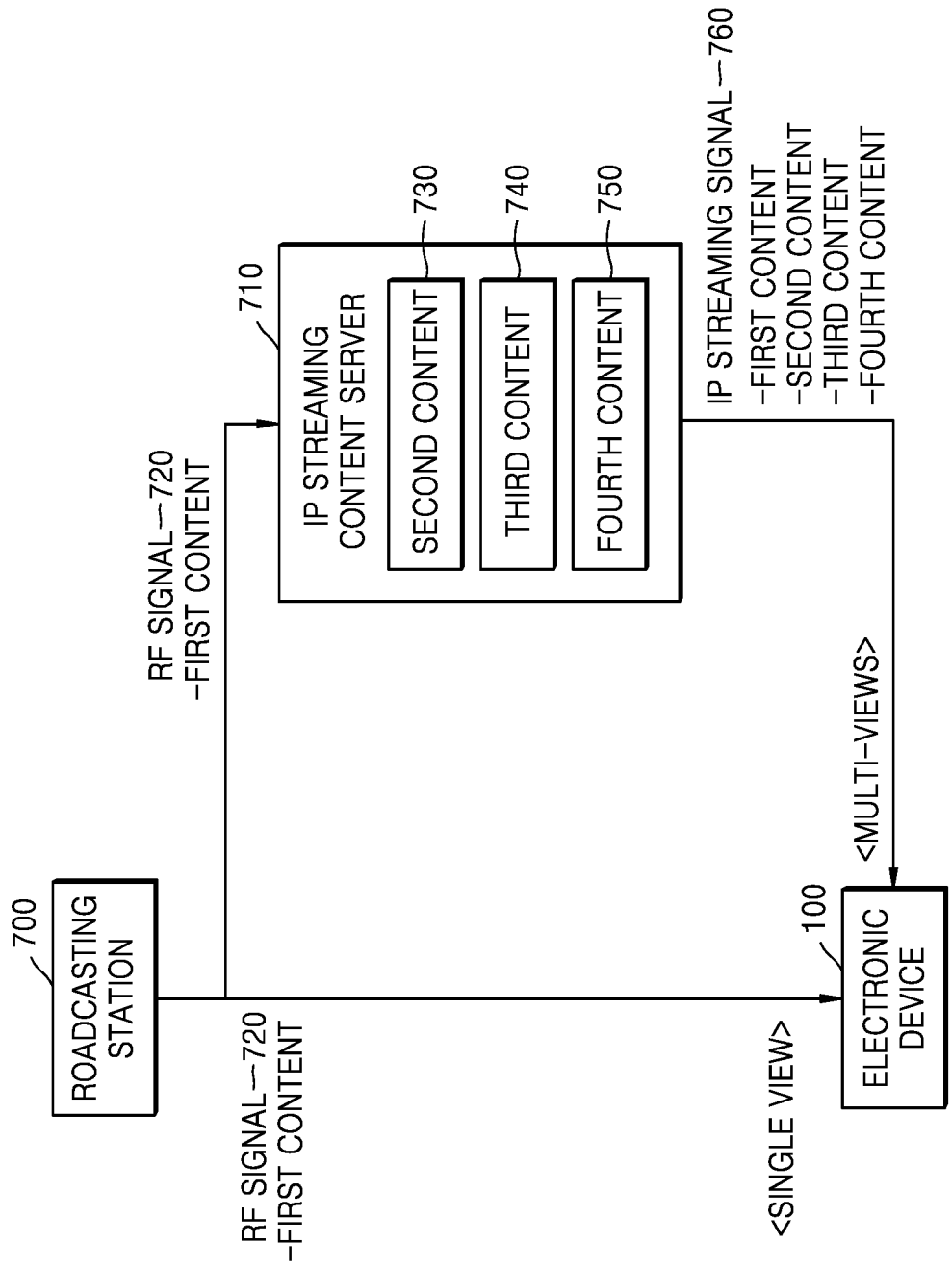
FIG. 7 illustrates an example of a radio frequency (RF) signal received in a single-view mode and an Internet protocol (IP) streaming signal received in a multi-view mode, according to an embodiment.

FIG. 7 illustrates an example of an RF signal received in a single-view mode and an IP streaming signal received in a multi-view mode, according to an embodiment.

In the single-view mode, the electronic device 100 may receive the RF signal containing first content 720 from a broadcasting station 700 and display the first content on a single screen. Alternatively, the electronic device 100 may receive the RF signal from the broadcasting station 700 through an external device, such as a set-top box, etc.

In the multi-view mode, a plurality of pieces of other content associated with the first content are to be provided, together with the first content transmitted from the broadcasting station. Thus, the content provided in the multi-view mode may be provided by an IP streaming content server 710. The IP streaming content server 710 may receive, in real time, the RF signal containing the first content 720 broadcast from the broadcasting station 700, and may package the received first content 720 with other pieces of content associated with the first content 720, for example, second content 730, third content 740, and fourth content 750 and provide the packaged content to the electronic device 100 via an IP streaming signal 760. The IP streaming content server 710 may receive, from the broadcasting station 700, the RF signal containing the first content 720 broadcast from the broadcasting station 700, along with the second content 730, the third content 740, and the fourth content 750, and may package the first content 710, the second content 720, the third content 730, and the fourth content 740 altogether and provide the packaged content to the electronic device 100 via the IP streaming signal 760.

In the multi-view mode, the electronic device 100 may receive, from the IP streaming content server 710, the IP streaming signal 760 containing the first content 720, the second content 730, the third content 740, and the fourth content 750 and may output the plurality of pieces of content on a plurality of screens included in the multi-views, respectively.

As described above, the IP streaming signal may be provided to the electronic device 100 by processing or packaging the RF signal transmitted from a broadcasting station, and thus, the IP streaming signal received from the IP streaming content server 710 may always have a predetermined time difference from the RF signal broadcast in real time from the broadcasting station 700.

Figure 8:
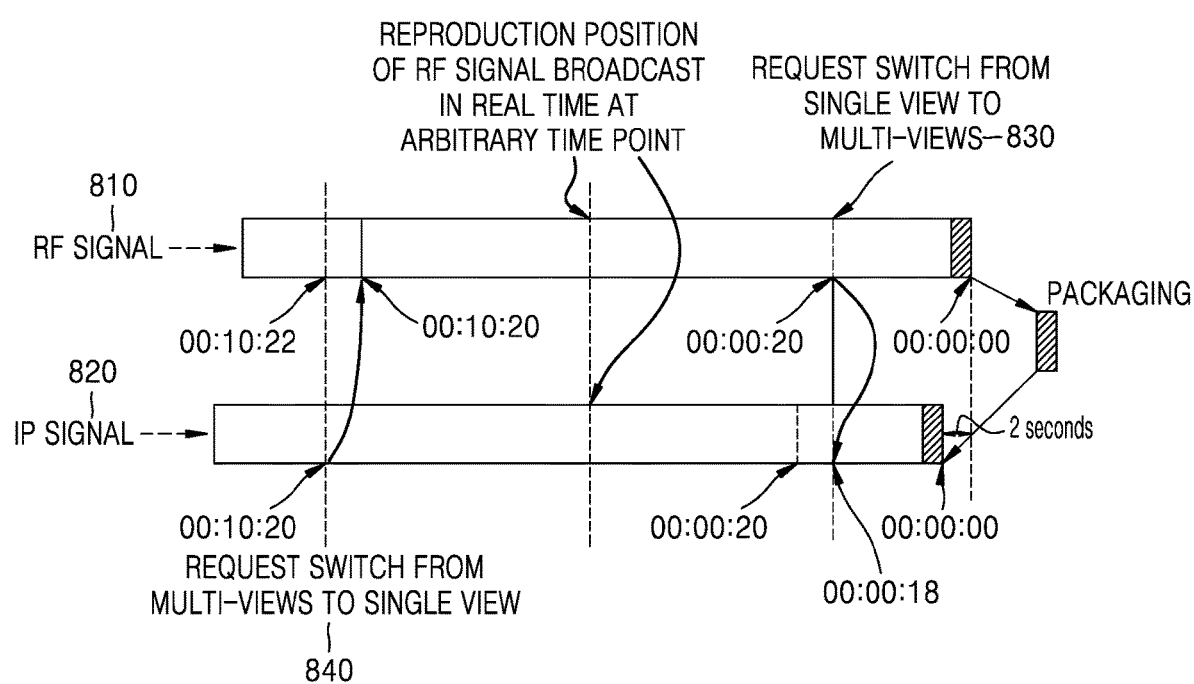
FIG. 8 is a reference diagram for describing a time difference between an RF signal received in a single-view mode and an IP streaming signal received in a multi-view mode, according to an embodiment.

FIG. 8 is a reference diagram for describing a time difference between an RF signal received in a single-view mode and an IP streaming signal received in a multi-view mode, according to an embodiment.

Referring to FIG. 8, an IP streaming signal 820 may be provided by packaging an RF signal 810 broadcast in real time, and thus, the IP streaming signal 820 may be provided after a predetermined time period after the RF signal 810 is transmitted. Thus, the electronic device 100 may always receive the IP streaming signal 820 delayed compared with the RF signal 810. For example, when a time difference between the IP streaming signal 820 and the RF signal 810 is two seconds, the electronic device 100 may receive a predetermined portion of the IP streaming signal, containing the same content as a predetermined portion of the RF signal, after two seconds after the predetermined portion of the RF signal containing the content is received.

For example, when a request of a switch from a single view to multi-views is received at a reproduction position 00:00:20 of the RF signal, the IP streaming signal 820 received by the electronic device 100 by requesting the IP streaming signal 820 from the IP streaming server, at a time point at which the multi-view switch request is received, may correspond to a reproduction position 00:00:18, due to the time difference between the RF signal and the IP streaming signal.

As described above, due to a time difference between the RF signal and the IP streaming signal, the electronic device 100 may display content corresponding to the IP streaming signal, in the multi-views, as a delayed state according to the time difference, when the single view is switched to the multi-views.

As described above, when after the electronic device 100 provides the multi-views based on the IP streaming signal as the delayed state according to the time difference between the RF signal and the IP streaming signal, the electronic device 100 receives a request 840 for a switch from the multi-views to the single view, the electronic device 100 may release the multi-views, that is, may stop displaying the multi-views based on the IP streaming signal, and may provide the single view based on the RF signal. However, in this case, because the IP streaming signal 820 has the predetermined time difference from the RF signal 810 broadcast in real time, the screen may have to be switched to a further proceeded reproduction position according to the predetermined time difference, when, right at the time point of the single-view switch request, the RF signal is received and content is displayed based on the RF signal. That is, for example, referring to FIG. 8, when the single-view switch request 840 is received at a reproduction position 00:10:20 of the IP streaming signal 820, the screen may have to be switched to a reproduction position 00:10:22 of the RF signal 810, when the RF signal is received and displayed right at the time point of the single-view switch request 840. In this case, the screen viewed by the user, the screen corresponding to the reproduction position 00:10:20 of the same content, may be suddenly switched to the reproduction position 00:10:22 according to the single-view switch, and thus, the screen may have to be disconnected, and content for about two seconds may have to be skipped, which may cause an inconvenient experience to the user. Therefore, in order to prevent the screen disconnection phenomenon, it is desirable to display the content based on the RF signal at the same reproduction position as the reproduction position of the IP streaming signal 820, when the switch between the multi-views and the single view is requested. That is, referring to FIG. 8, it is desirable to display the content based on the RF signal from the reproduction position 00:10:20, which is the same reproduction position as the reproduction position 00:10:20 at a time point at which the single-view switch request 840 is received. To this end, it is desirable to store the RF signal in the buffer during a multi-view mode operation and to search for and reproduce an appropriate reproduction position in the RF signal stored in the buffer when the single-view switch request is received.

Figure 9:
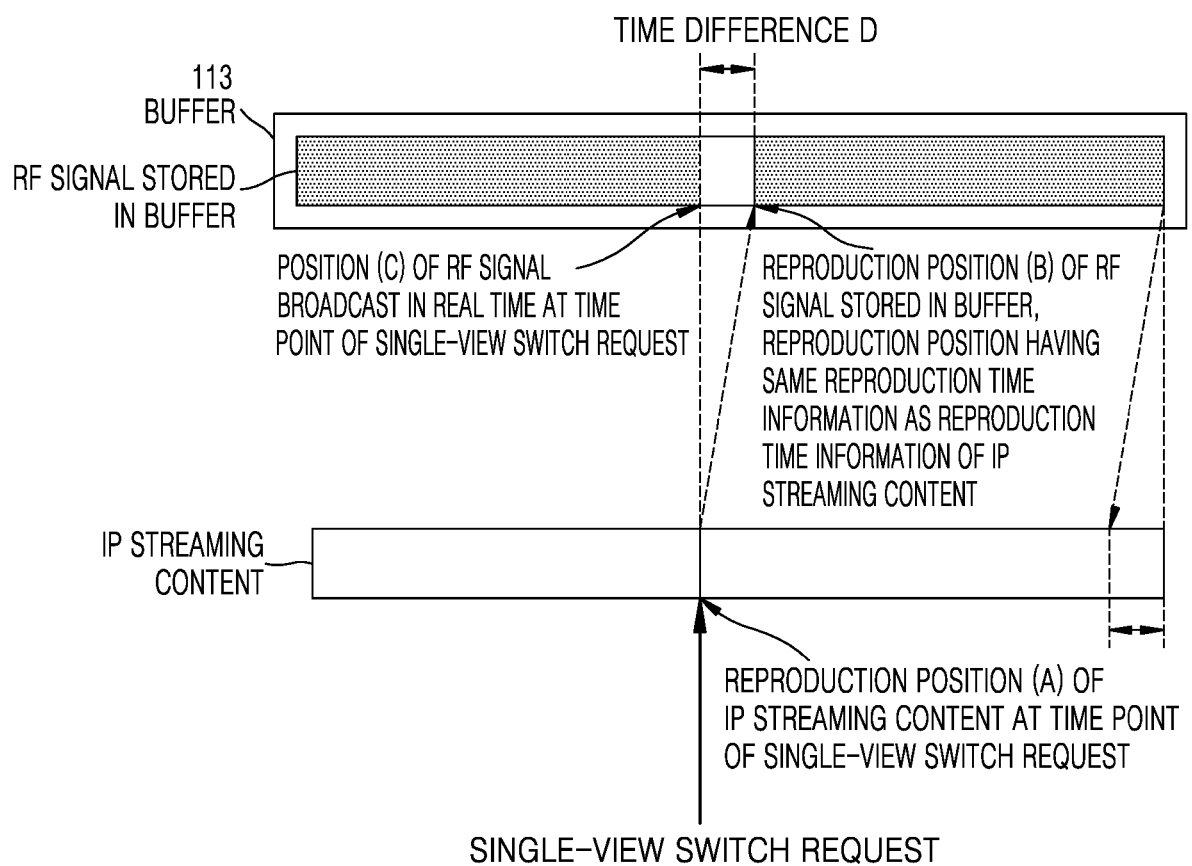
FIG. 9 is a reference diagram for describing a method of searching for a reproduction position of an RF signal for seamless screen switching during a single-view switch, according to an embodiment.

FIG. 9 is a reference diagram for describing a method of searching for a reproduction position of an RF signal for a seamless screen switch during a single-view switch, according to an embodiment.

Referring to FIG. 9, when a switch from multi-views to a single view is requested, the electronic device 100 may not only receive IP streaming content to be displayed in the multi-views and display a plurality of pieces of content on a plurality of screens, but may also store, in the buffer 113, an RF signal received in the single view, for a seamless screen switch to the single view later again. As described above, by storing the RF signal in the buffer 113 to a predetermined extent, the electronic device 100 may not, according to the switch back to the single view, switch to the screen of a reproduction position of the RF signal broadcast in real time, and may enable a shift to a reproduction position delayed by a predetermined time period compared with the reproduction position of the RF signal broadcast in real time. Therefore, the electronic device 100 may realize a seamless screen switch to the single view.

According to an embodiment, the electronic device 100 identify reproduction time information of IP streaming content at a time point at which a single-view switch request 900 is received. Also, the electronic device 100 may identify a reproduction position B in the RF signal stored in the buffer 113, the reproduction position B having the same reproduction time information as the reproduction time information of the IP streaming content at the time point at which the single-view switch request 900 is received. By starting reproducing the content in the single view from the identified reproduction position B, the last screen of the IP streaming content at the time point of the single-view switch request and the first screen of the RF signal stored in the buffer may be seamlessly connected. When, according to the single-view switch, the switch is directly performed based on the RF signal broadcast in real time, rather than using the RF signal stored in the buffer, the screen is switched to a position C of the RF signal broadcast in real time at a time point of the single-view switch request, so that the content may be shown on a single-view screen by skipping an amount of content of about a time difference D, as illustrated in FIG. 9. Thus, the user may be provided with an awkward and unnatural screen.

Figure 10:
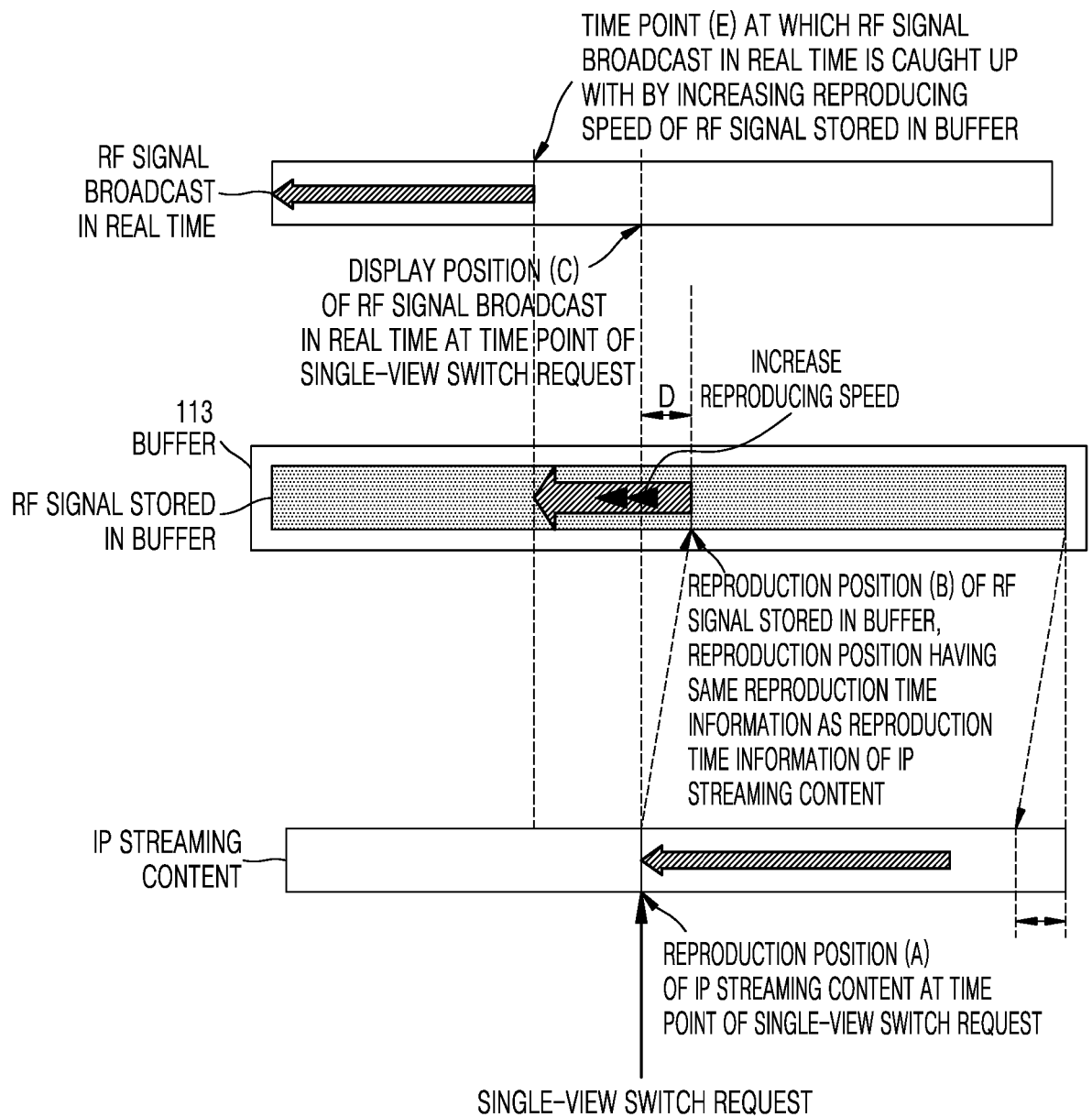
FIG. 10 is a reference diagram for describing a method of solving a time difference between a reproduction position of an RF signal stored in a buffer and a display position of an RF signal broadcast in real time, according to an embodiment.

FIG. 10 is a reference diagram for describing a method of solving a time difference between the reproduction position of the RF signal stored in the buffer and a display position of the RF signal broadcast in real time, according to an embodiment.

As described with reference to FIG. 9, by reproducing the content by delaying the reproduction position by using the RF signal stored in the buffer, according to the single-view switch, a seamless screen switch between the screen of the IP streaming content in the multi-view mode and the screen of the content based on the RF signal in the single-view mode may be realized. However, the reproduction position B from which the content is started to be reproduced by using the RF signal stored in the buffer may have the time difference D from the display position C of the RF signal broadcast in real time at the time point of the single-view switch request, and thus, when the content is displayed by using the RF signal stored in the buffer, the RF signal may always be displayed by being delayed according to the time difference D compared with the RF signal broadcast in real time.

Referring to FIG. 10, according to an embodiment, the electronic device 100 may increase a reproducing speed of the RF signal stored in the buffer 113 by a predetermined rate by using a catch up mode, etc. in order to solve the time difference D described above, and thus, may gradually catch up with the time point of the real time broadcasting. For example, the electronic device 10 may increase the reproducing time of the RF signal stored in the buffer 113 by 1.2 times in order to solve the time difference D, and thus, when a predetermined time point D is reached, the electronic device 10 may catch up with the reproduction position of the RF signal broadcast in real time. When the RF signal stored in the buffer is reproduced, and by increasing the reproducing speed of the RF signal stored in the buffer, the reproduction position of the RF signal broadcast in real time is caught up with, the electronic device 100 may release the allocation of the buffer 113 and may directly receive the RF signal broadcast in real time and display the RF signal on the single-view screen.

Figure 11:
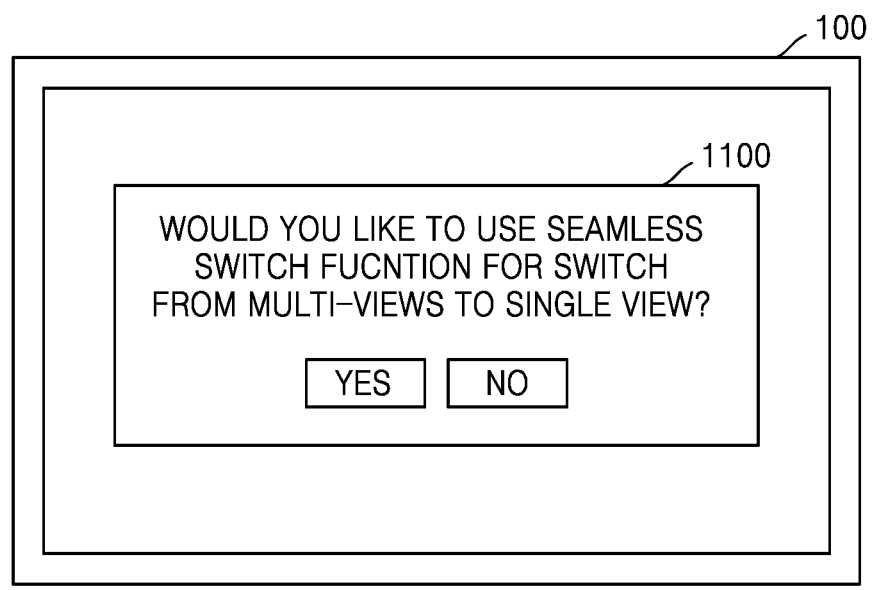
FIG. 11 illustrates an example of a user interface configured to allow a user to select a seamless switch function when multi-views are switched to a single view, according to an embodiment.

FIG. 11 illustrates an example of a user interface configured to allow a user to select a seamless switch function when multi-views are switched to a single view, according to an embodiment.

When the multi-views are switched to the single-view as described in this specification, a user may select whether or not to apply a seamless switch function, through a setting menu, etc. Depending on users, some of them may regard the seamless screen switch to be important when the multi-views are switched to the single view and thus may select the seamless switch function, but the others may desire to view an RF broadcast transmitted in real time, rather than a seamless screen. Therefore, to provide a function appropriate for a selection of the user, the electronic device 100 may provide the user interface asking whether or not to apply the seamless switch function.

Referring to FIG. 11, the electronic device 100 may output a user interface 1100, such as <Would you like to use a seamless switch function for a switch from multi-views to a single view? Yes No>. When a user selects to use the seamless switch function according to the user interface 1100, the electronic device 100 may use the seamless switch function when the multi-views are switched to the single view, as described in this specification, to store the RF signal in the buffer according to a multi-view switch, and use the RF signal stored in the buffer according to a single-view switch, thereby performing a seamless screen switch.

When the user selects not to use the seamless switch function according to the user interface 1100, the electronic device 100 may not use the RF signal stored in the buffer when the multi-views are switched to the single view and may directly receive the RF signal broadcast in real time and display the content.

Figure 12:
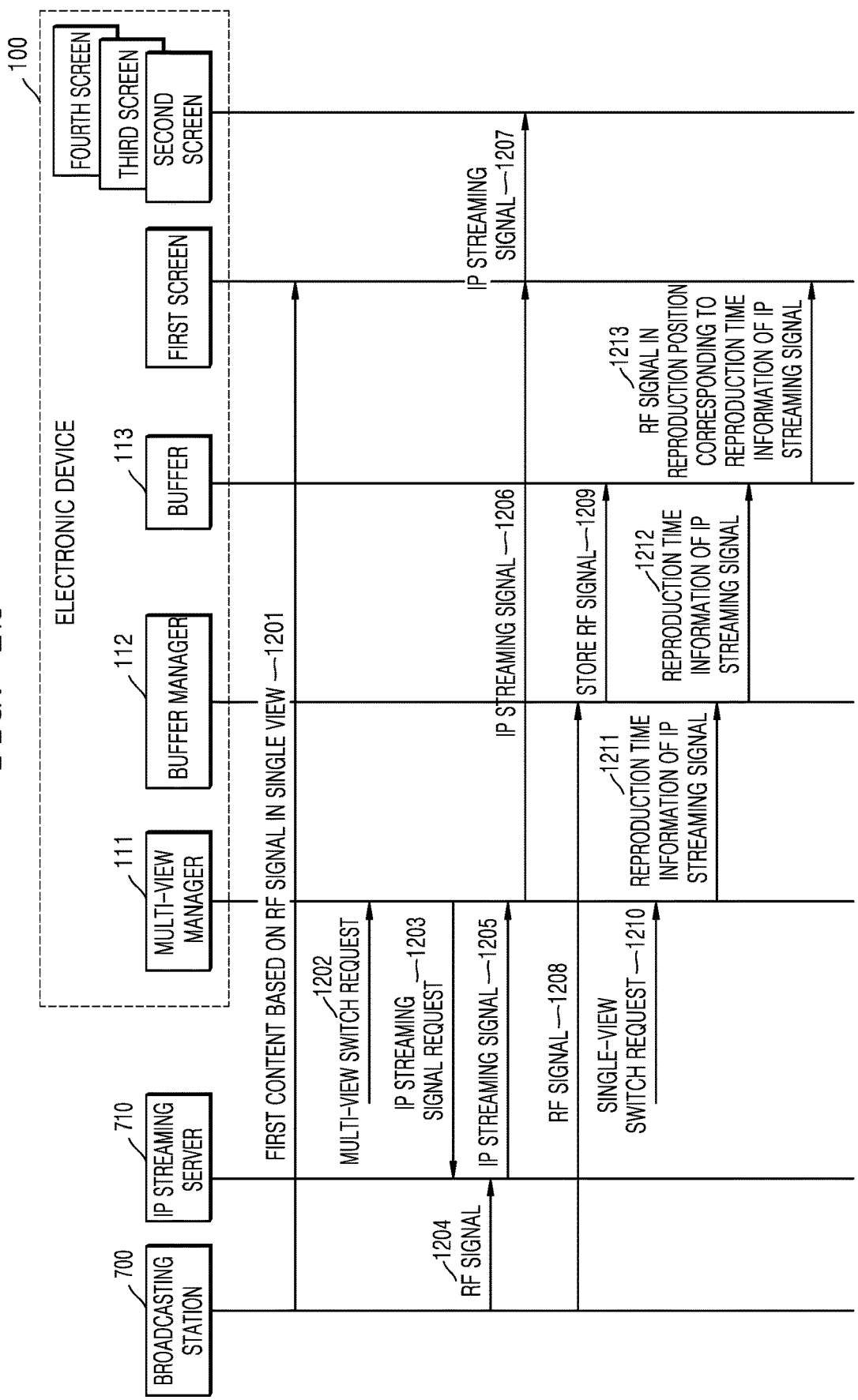
FIG. 12 is illustrates an example of a flowchart of operations, performed by an electronic device, of executing a seamless screen switch function when a multi-view mode is switched to a single-view mode, according to an embodiment.

FIG. 12 is illustrates an example of a flowchart of operations, performed by the electronic device 100, of executing a seamless screen switch function when a multi-view mode is switched to a single-view mode, according to an embodiment.

Referring to FIG. 12, in operation 1201, the electronic device 100 may receive an RF signal from a broadcasting station 700 and display first content based on the received RF signal in a single view. For example, the electronic device 100 may display the first content on a first screen configured as a single screen.

In operation 1202, the multi-view manager 111 of the electronic device 100 may receive a multi-view switch request.

In operation 1203, the multi-view manager 111 may request an IP streaming signal from an IP streaming server 710. Here, the multi-view manager 111 may request the IP streaming signal from the IP streaming server 710, based on identification information, etc. of the first content displayed in the single view.

In operation 1204, the IP streaming server 710 may receive the RF signal from the broadcasting station 700, and in operation 1205, the IP streaming server 710 may transmit the IP streaming server obtained based on the received RF signal to the multi-view manager 111.

In operations 1206 and 1207, the multi-view manager 111 may control a plurality of screens included in multi-views to display the received IP streaming signal. For example, the multi-view manager 111 may control a first screen to display the first content of the IP streaming signal and second to fourth screens to respectively display second to fourth content of the IP streaming signal.

The multi-view manager 111 may control the buffer manager 112 to store, in the buffer, the RF signal received in the single view. That is, in operation 1208, the buffer manager 112 may receive the RF signal, and in operation 1209, the buffer manager may store the received RF signal in the buffer 113.

In operation 1210, the multi-view manager 111 may receive a single-view switch request.

In operation 1211, the multi-view manager 11 may identify reproduction time information of the IP streaming signal at a time point at which the single-view switch request is requested and may provide the identified reproduction time information of the IP streaming signal to the buffer manager 112.

In operation 1212, the buffer manager 112 may identify a reproduction position of the RF signal stored in the buffer, the reproduction position having the same reproduction time information as the received reproduction time information of the IP streaming signal, and in operation 1213, may control the RF signal to be reproduced from the reproduction position of the RF signal identified in the buffer 113.

One or more embodiments may be implemented in the form of a recording medium including a computer-executable instruction, such as a program module executed by a computer. The computer-readable recording medium may be an arbitrary available medium accessible by a computer and includes all of volatile and non-volatile media and detachable and non-detachable media. Also, the computer-readable media may include computer storage media. The computer storage recording medium includes all of volatile and non-volatile media and detachable and non-detachable media that are realized by an arbitrary method or technique for storing information, such as computer-readable instructions, data structures, program modules, or other data.

The embodiments of the disclosure may be realized as a software (S/W) program including instructions stored in computer-readable storage media.

A computer may be a device for calling the instructions stored in the storage media and performing, in response to the called instructions, operations according to the embodiments of the disclosure, and may include the electronic device according to the embodiments of the disclosure.

The computer-readable storage media may include non-transitory storage media. Here, the term "non-transitory" of non-transitory storage media only denotes that the non-transitory storage media do not include a signal and are tangible, and does not distinguish whether the storage media semi-permanently or temporarily store the data.

Also, the controlling methods according to the embodiments of the disclosure may be included in a computer program product. The computer program product may be transacted between a seller and a purchaser, as a product.

The computer program product may include an S/W program or a computer-readable storage medium in which the S/W program is stored. For example, the computer program product may include a product in the form of an S/W program (for example, a downloadable application) that is electronically distributed through a manufacturer of a device or an electronic market (for example, a Google play store or an App store). For electronic distribution, at least a portion of the S/W program may be stored in a storage medium or temporarily generated. In this case, the storage medium may include a server of a manufacturer, a server of an electronic market, or a storage medium of a broadcasting server temporarily storing the software program.

In a system including a server and a device, the computer program product may include a storage medium of the server or a storage medium of the device. Alternatively, when there is a third device (for example, a smartphone) connected to the server or the device for communication, the computer program product may include a storage medium of the third device. Alternatively, the computer program product may directly include an S/W program transmitted from the server to the device or the third device or transmitted from the third device to the device.

In this case, any one of the server, the device, and the third device may perform the method according to the embodiments of the disclosure by executing the computer program product. Alternatively, at least two of the server, the device, and the third device may perform the method according to the embodiments of the disclosure in a distributed fashion by executing the computer program product.

For example, the server (for example, a cloud server or an artificial intelligence (AI) server) may execute the computer program product stored in the server to control the device connected to the server for communication to perform the methods according to the embodiments of the disclosure.

As another example, the third device may execute the computer program product to control the device connected to the third device for communication to perform the method according to the embodiments of the disclosure. When the third device executes the computer program product, the third device may download the computer program product from the server and execute the downloaded computer program product. Alternatively, the third device may execute the computer program product provided in a pre-loaded state to perform the method according to the embodiments of the disclosure.

Also, in this specification, a "unit" may refer to a hardware component, such as a processor or a circuit, and/or a S/W component executed by a hardware component such as a processor.

The above descriptions of the disclosure are examples, and it would be understood by one of ordinary skill in the art that the disclosure may be easily modified as other specific forms without changing the technical concept or essential features of the disclosure. Hence, it will be understood that the embodiments of the disclosure described above are examples in all aspects and are not limiting of the scope of the disclosure. For example, each of components described as a single unit may be executed in a distributed fashion, and likewise, components described as being distributed may be executed in a combined fashion.

The scope of the disclosure is indicated by the claims rather than by the detailed description of the disclosure, and it should be understood that the claims and all modifications or modified forms drawn from the concept of the claims are included in the scope of the disclosure.

The invention claimed is:

1. An electronic device comprising:
a memory to store one or more instructions; and
a processor configured to execute the one or more instructions, which are stored in the memory, to:
display a first content in a single view using a radio frequency (RF) signal corresponding to the first content;
based on a multi-view switch request to switch from the single view to a multi-views, display a multi-view screen, one screen among the multi-view screen outputting the first content based on an Internet protocol (IP) streaming signal corresponding to the first content, while receiving the radio frequency (RF) signal corresponding to the first content and storing the RF signal in a buffer;
based on a single-view switch request to switch from the multi-views to the single view, identify reproduction time information of the IP streaming signal at a time point at which the single-view switch request occurs; and
identify a reproduction position of the RF signal stored in the buffer having reproduction time information corresponding to the identified reproduction time information of the IP streaming signal, and display the first content in the single view using the RF signal stored in the buffer from the identified reproduction position.

2. The electronic device of claim 1, wherein the content based on the IP streaming signal is displayed through a plurality of screens in the multi-views in association with the content based on the RF signal displayed in the single view.

3. The electronic device of claim 1, wherein content based on the IP streaming signal displayed through a first screen from among a plurality of screens included in the multi-views is same as the content based on the RF signal displayed in the single view.

4. The electronic device of claim 3, wherein the processor is further configured to execute the one or more instructions to:
identify attribute information of the content based on the IP streaming signal displayed through the first screen; and
according to the identified attribute information, output, on a region of the first screen, a user interface to receive a user input to allow selecting to switch the content displayed on the first screen from among the plurality of screens included in the multi-views to being displayed in the single view.

5. The electronic device of claim 4, wherein the processor is further configured to execute the one or more instructions to, based on the user input selecting to switch to the single view, display the content displayed on the first screen from among the plurality of screens included in the multi-views in the single view.

6. The electronic device of claim 1, wherein the reproduction position identified in the stored RF signal indicates a delayed time point compared with a current reproduction position of the RF signal broadcast in real time.

7. The electronic device of claim 6, wherein the processor is further configured to execute the one or more instructions to:
release the buffer storing the RF signal and display the content by switching to an RF live view, based on the reproduction position in the stored RF signal being same as the current reproduction position of the RF signal broadcast in real time by increasing a reproducing speed for displaying the content from the identified reproduction position.

8. The electronic device of claim 1, wherein
the content is displayed using RF signal broadcast in real time, in the single view before the multi-view switch occurs, and
the content is displayed using the RF signal stored in the buffer, in the single view according to the single-view switch to switch from the multi-views to the single view.

9. An operating method of an electronic device, the operating method comprising:
identifying whether a multi-view switch to switch from a single view in which content is displayed on a single screen to multi-views of displaying through a plurality of screens occurs;
displaying a first content in a single view using a radio frequency (RF) signal corresponding to the first content;
based on a multi-view switch request to switch from the single view to a multi-views, displaying a multi-view screen, one screen among the multi-view screen outputting the first content based on an Internet protocol (IP) streaming signal corresponding to the first content, while receiving the radio frequency (RF) signal corresponding to the first content and storing the RF signal in a buffer;
based on a single-view switch request to switch from the multi-views to the single view, identifying reproduction time information of the IP streaming signal at a time point at which the single-view switch request occurs; and
identifying a reproduction position of the RF signal stored in the buffer having reproduction time information corresponding to the identified reproduction time information of the IP streaming signal, and displaying the first content in the single view using the RF signal stored in the buffer from the identified reproduction position.

10. The operating method of claim 9, wherein the content based on the IP streaming signal displayed through the plurality of screens in the multi-views is associated with the content based on the RF signal displayed in the single view.

11. The operating method of claim 9, wherein content based on the IP streaming signal displayed through a first screen from among the plurality of screens included in the multi-views is same as the content based on the RF signal displayed in the single view.

12. The operating method of claim 11, further comprising:
identifying attribute information of the content based on the IP streaming signal displayed through the first screen; and
according to the identified attribute information, outputting, on a region of the first screen, a user interface to receive a user input to allow selecting to switch the content displayed on the first screen from among the plurality of screens included in the multi-views to being displayed the single view.

13. The operating method of claim 12, further comprising, based on the user input for selecting to switch to the single view, displaying the content displayed on the first screen from among the plurality of screens included in the multi-views in the single view.

14. The operating method of claim 9, wherein the reproduction position identified in the stored RF signal indicates a delayed time point compared with a current reproduction position of the RF signal broadcast in real time.

15. The operating method of claim 14, further comprising:
releasing the buffer storing the RF signal and displaying the content by switching to an RF live view, based on the reproduction position in the stored RF signal being same as the current reproduction position of the RF signal broadcast in real time by increasing a reproducing speed for displaying the content from the identified reproduction position.

16. The operating method of claim 9, wherein
the content is displayed using RF signal broadcast in real time, in the single view before the multi-view switch occurs, and
the content is displayed using the RF signal stored in the buffer, in the single view according to the single-view switch to switch from the multi-views to the single view.

17. A non-transitory computer-readable recording medium having recorded thereon one or more programs executable by a processor of an electronic device for realizing an operating method of the electronic device, the operating method comprising:
identifying whether a multi-view switch to switch from a single view in which content is displayed on a single screen to multi-views of displaying through a plurality of screens occurs;
displaying a first content in a single view using a radio frequency (RF) signal corresponding to the first content;
based on a multi-view switch request to switch from the single view to a multi-views, displaying a multi-view screen, one screen among the multi-view screen outputting the first content based on an Internet protocol (IP) streaming signal corresponding to the first content, while receiving the radio frequency (RF) signal corresponding to the first content and storing the RF signal in a buffer;
based on a single-view switch request to switch from the multi-views to the single view, identifying reproduction time information of the IP streaming signal at a time point at which the single-view switch request occurs; and
identifying a reproduction position of the RF signal stored in the buffer having reproduction time information corresponding to the identified reproduction time information of the IP streaming signal, and displaying the first content in the single view using the RF signal stored in the buffer from the identified reproduction position.

* * * * *